Dec. 25, 1962  F. E. TUTTHILL  3,070,021
ADJUSTABLE HIGH TURN-ON CONTROL
Filed Aug. 10, 1960  3 Sheets-Sheet 1

INVENTOR.
FRED E. TUTTHILL
BY Bosworth, Sessions,
Herrstrom & Knowles
ATTORNEYS.

Dec. 25, 1962  F. E. TUTTHILL  3,070,021
ADJUSTABLE HIGH TURN-ON CONTROL
Filed Aug. 10, 1960  3 Sheets-Sheet 2

INVENTOR.
FRED E. TUTTHILL
BY Bosworth, Sessions
Herrstrom & Knowles
ATTORNEYS.

Dec. 25, 1962 F. E. TUTTHILL 3,070,021
ADJUSTABLE HIGH TURN-ON CONTROL
Filed Aug. 10, 1960 3 Sheets-Sheet 3
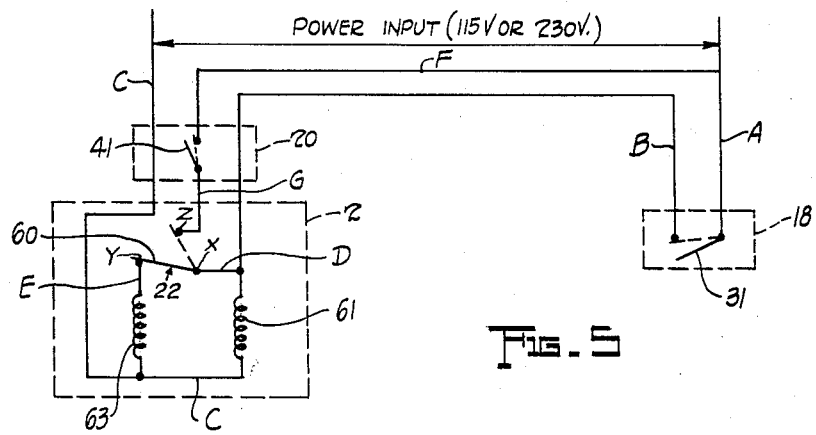
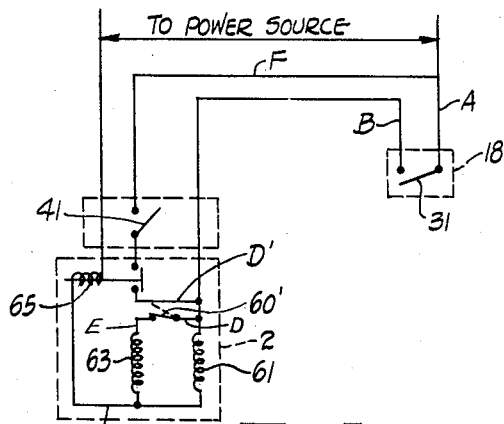
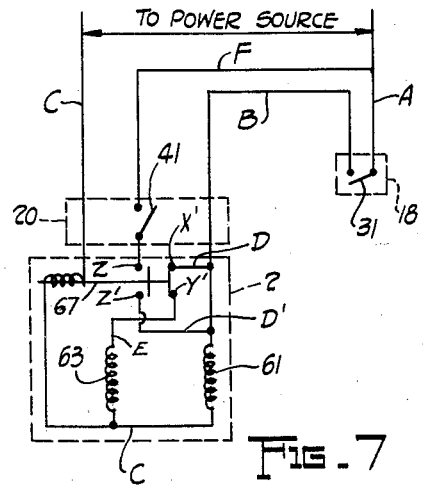
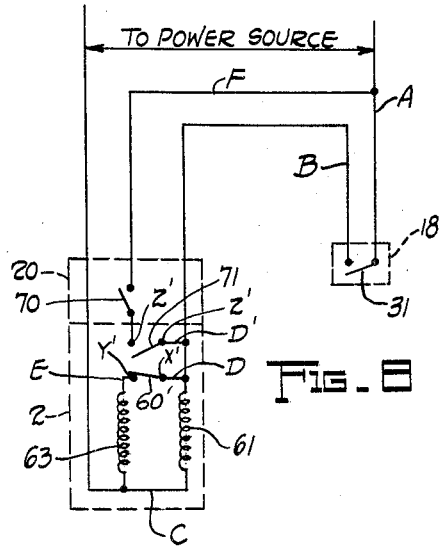
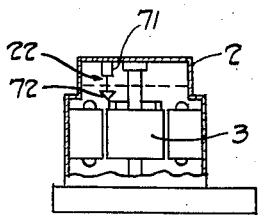
INVENTOR.
FRED E. TUTTHILL
BY Bosworth, Sessions,
Herrstrom + Knowles
ATTORNEYS.

United States Patent Office 3,070,021
Patented Dec. 25, 1962

3,070,021
ADJUSTABLE HIGH TURN-ON CONTROL
Fred E. Tutthill, Grafton, Ohio, assignor to Kenco Pump Divisions of the American Crucible Products Company, Lorain, Ohio, a corporation of Ohio
Filed Aug. 10, 1960, Ser. No. 48,605
11 Claims. (Cl. 103—25)

This invention relates to pump controls and more particularly to pressure responsive controls for actuating and controlling submersible pumps.

Pressure responsive controls for actuating and/or controlling submersible pumps have attained a well recognized status in the submersible pump art and enjoy wide usage for controlling sump, bilge and other types of submersible pumps. Such controls have been adapted to control submersible pumps either in response to the level and/or changing level of the liquid to be pumped alone or in response to the level of the liquid to be pumped, a pressure or other condition resulting from the actuation and operation of the pump and a change in the condition resulting from operation of the pump upon evacuation of the liquid to be pumped or a reduction in the level of the liquid to be pumped.

This invention is concerned with the type of pressure responsive pump control which is adapted to actuate the pump in response to a predetermined liquid level. The utility of such controls has been limited by the fact that the range of predetermined liquid levels through which a given control could be adapted or adjusted to respond to actuate the pump has been severely limited. Thus a given control has only been effective for actuating a pump at a predetermined liquid level chosen within a relatively narrow range of liquid levels, if the control provided for any range of liquid level whatsoever. Accordingly the given control (and the pumps associated therewith) could not be used with facility in a wide variety of applications or uses or in applications or uses wherein it is desired or necessary that the turn-on point (i.e. predetermined liquid level at which the pump is actuated) be quickly and easily varied over a wide range of levels.

It is therefore a general object of this invention to provide a new improved pressure sensitive pump control which is adapted to actuate a pump over an extremely, and for practical purposes infinitely, wide range of predetermined liquid levels.

Further objects of this invention include the provision of a pressure sensitive control for actuating a pump in response to a predetermined liquid level which is useful over a wide range of liquid levels, limited only by the length of the electrical conduit used; which is efficient and foolproof in operation and structure; which requires no further adjustment on the part of the use except for proper positioning within the confines of the vessel, container or closure within which the liquid, the level of which is to actuate the control or pump, collects or is disposed; which is economically manufactured and used; which is adapted for use over a wide range of predetermined liquid levels without regard to or for the pumping head and independently thereof; which provides for independent control of pump actuation, maintenance of operation after actuation and deactuation; which embodies a new and improved electrical circuit; which has first means responsive to a predetermined condition to actuate the pump, second means responsive to a second predetermined condition to maintain operation of the pump subsequent to actuation and to deactuate the pump, and third means responsive to a predetermined condition consequent upon actuation of the pump to cut out or bypass said first means; which precludes the necessity of compensating springs and other adjusting devices for varying the level at which the control responds to actuate the pump; and, which functions even though the position of the actuating means be varied after actuation of the pump.

Another object of this invention is the provision of an apparatus control having a new and improved structure and electrical circuit, including first means for actuating the apparatus in response to a predetermined condition, second means for maintaining the apparatus in operation, after actuation, in response to a different predetermined condition and for deactuating the apparatus and third means for transferring electrical control of the apparatus is from said first means to said second means in response to a predetermined condition arising from actuation of the apparatus by said first means.

Other objects of this invention include the provision of a pump control which has pressure responsive means responsive to a predetermined liquid level to actuate a pump, second means responsive to a second predetermined condition to maintain operation of the pump after actuation, and to deactuate the pump and third means responsive to a predetermined condition arising from actuation of the pump to transfer control of the pump motor circuit from said first means to said second means and the provision of such a control, which is useful and effective, over a wide range of predetermined liquid levels, to control actuation of the pump.

A still further object of this invention is to provide a control having one or more of the objects and advantages set forth above.

These and other objects and advantages of this invention will appear from the following description of preferred and modified forms thereof, reference being had to the accompanying drawings in which:

FIGURE 5 is a diagram of the circuit for a control embodying a preferred form of this invention;

FIGURE 6 is a diagram of the circuit for a control embodying a modified form of this invention;

FIGURE 7 is a diagram of the circuit for a control embodying another modified form of this invention;

FIGURE 8 is a diagram of the circuit for a control embodying still another modified form of this invention; and, FIGURE 9 is a schematic view of a pump, such as that shown in FIGURE 2, adopted for use with a control embodying the form of this invention disclosed in FIGURE 8.

Figure 2:
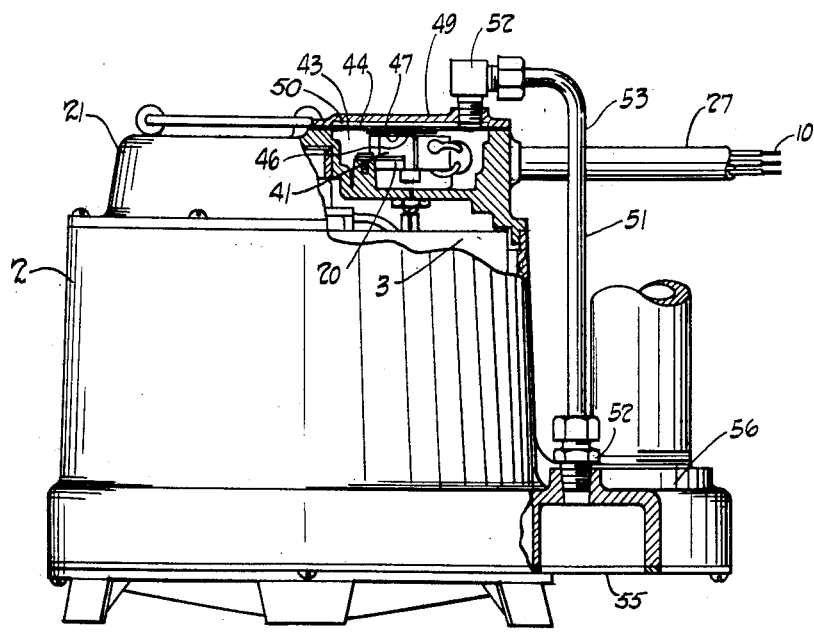
FIGURE 2 is an elevation, partly in section, of a typical pump with which a control embodying this invention is used, and a part of the control embodying this invention.
Figure 3:
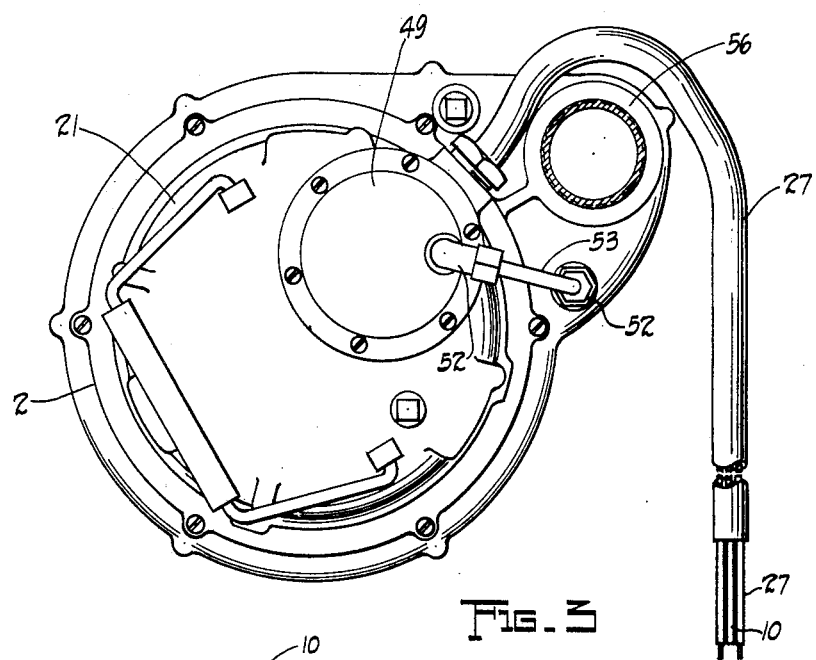
FIGURE 3 is a top view of the pump control part shown in FIGURE 2.

This invention will be described in conjunction with and as a control for the pump shown in FIGURES 1, 2 and 3 but it is to be understood that controls embodying this invention may be adapted to control other types of pumps and apparatus and other types of pumps and apparatus may be adapted for use with controls embodying this invention.

Broadly a control embodying this invention comprises first means responsive to a first predetermined condition to close a circuit and actuate the apparatus controlled, second means responsive to a second condition to maintain the apparatus in operation after actuation and to deactuate the apparatus and third means responsive to a predetermined condition arising upon actuation of the apparatus to transfer control of the electrical circuit from the first means to the second means.

Figure 1:
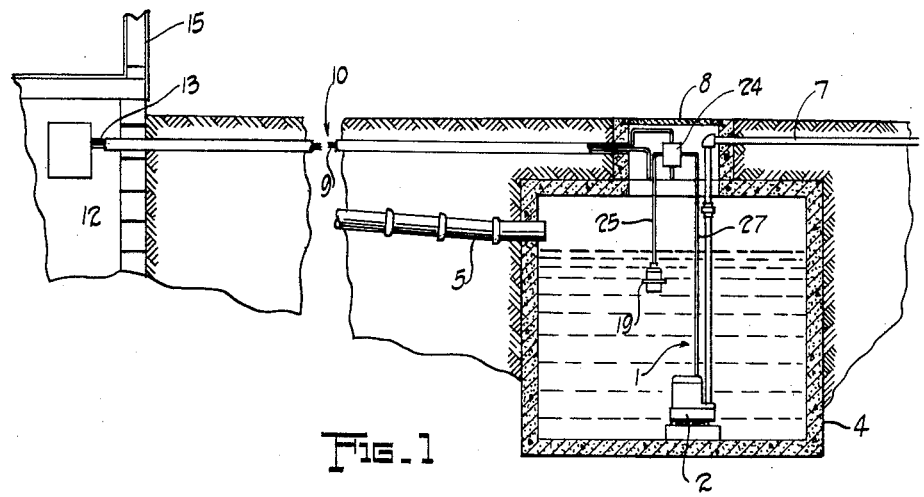
FIGURE 1 is a schematic view of a typical installation of a submersible pump and a control, therefor, embodying a preferred form of this invention.

More particularly, as best seen in FIGURE 1 a control embodying this invention and adapted to actuate a pump over a wide variable range of predetermined liquid levels, is shown as a part of and in the environment of a typical pumping system, indicated generally at 1.

The pumping system 1 includes the submersible pump 2, which is to be controlled by a control embodying this invention. Pump 2 has an impeller, not shown, which is driven by a split phase motor 3 (FIGURE 2) and is disposed at the bottom of a collection box or sump 4 within which water collects as through inlet tile 5 and from which the water is pumped through the pump discharge piping 7. Suitable access means 8 is provided for collection box 4 and suitable waterproof electrical leads 9 and a breather tube 10 lead from the pumping system and box 4. The electrical leads connect to a suitable power source 12 which together with the remote end 13 of the breather tube is disposed in a dry location as within the basement of building 15. All of the above is old and, per se, forms no part of this invention.

Figure 4:
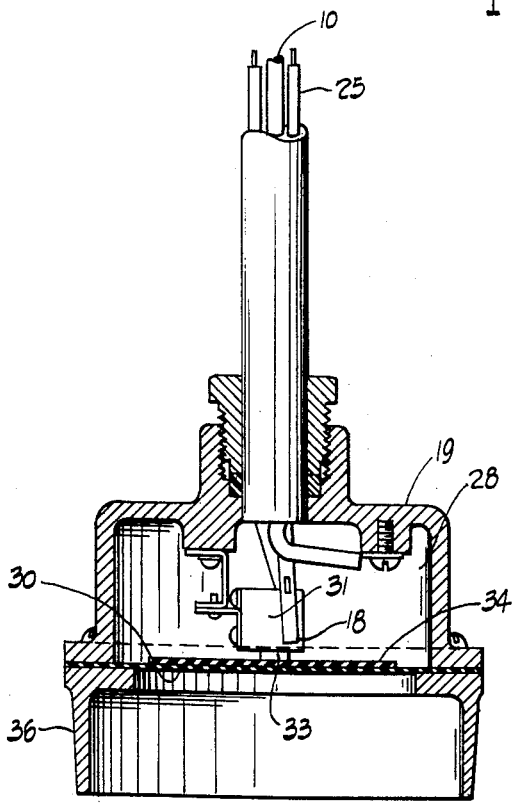
FIGURE 4 is a vertical section of a preferred form of "turn-on" part, of a control embodying this invention.

The pumping system 1, as noted above, also includes the control embodying this invention, which conveniently is disposed in a plurality of separate housings interconnected by suitable electrical leads. To this end the control includes a first means or variable turn-on indicated generally at 18, FIGURE 4, and adapted to actuate the pump in response to a predetermined hydrostatic pressure. Means 18 is disposed within a suitable housing 19, see FIGURE 1. The control also includes a second means indicated generally at 20 and adapted to maintain the pump operating after actuation and to deactuate the pump when the liquid within collection box 4 has been reduced to a predetermined level. Means 20 is conveniently disposed within and upon the housing 21 of pump 2 (FIGURES 2 and 3). The control also includes a third means indicated generally and shown schematically at 22 in FIGURE 5 and adapted, upon actuation of the pump and motor 3, to transfer control of the motor electrical circuit from the first means to the second means 20 by cutting out or bypassing the first means and cutting into the second means. The control also, conveniently, includes a waterproof junction box 24, FIGURE 1, which is adapted to be mounted within the collection box 4 and within which the electrical leads 9 (to the power source), 25 (to the variable turn on 18) and 27 (to the pump motor 3 and holding and turn off means 20) are interconnected. Breather tube 10 also leads to junction box 24 and from there conveniently by inclusion within the cable carrying the respective electrical leads to the turn-on 18 and the holding and turn off 20.

Variable turn-on 18 is adapted to respond to the hydrostatic pressure of a predetermined level of liquid to close the circuit and actuate the pump motor and to this end includes a chamber 28 (FIGURE 4), which is closed, on at least part of one side, preferably the lower, by a pressure sensitive diaphragm 30. Variable turn-on 18 also includes a switch 31 disposed within chamber 28 and having an operating button 33 in operable relation with diaphragm 30. A reinforcing disc 34 is preferably secured to diaphragm 30 and disposed intermediate the diaphragm and switch button 33. Also in order to provide protection for diaphragm 30, turn-on 18 preferably includes a shirt 36 which depends from housing 19 and encircles diaphragm 30. Switch 31 has a predetermined operating force and when the static level of the liquid collecting about variable turn-on rises above the diaphragm 30 sufficient to cause diaphragm 30 to be displaced, upwardly as viewed, against operating button 33 with a force greater than the operating force of switch 31 the switch is operated to close the circuit and actuate the pump. Conveniently, in a typical installation, switch 31 and diaphragm 30 are chosen so that about six inches of static water pressure causes turn-on 18 to close the circuit but the switch and diaphragm may be chosen to turn on at any desired liquid depth above diaphragm level. However, since the housing 19 containing turn-on 18 is locatable at any desired position or height within the collection box and relative to the bottom thereof, limited only by the length of the leads 25, the pump control embodying this invention is infinitely adjustable to turn on the pump at any liquid depth greater than the predetermined minimum established by the preselected switch and diaphragm.

As noted above a control embodying this invention also includes means 20 for maintaining the pump actuated after switch 31 has operated to actuate the pump and to deactuate the pump upon the occurrence of a predetermined condition such as the evacuation or reduction of the liquid to a predetermined minimum level. Means 20, see FIGURE 2, is conveniently included within the pump housing albeit it is within the scope of this invention to dispose means 20 within a housing of its own, which is either separate from or mounted on the pump housing and is connected with the pump by suitable electrical leads and other means. Also, while means 20 is described as responsive to a predetermined hydrostatic pressure or liquid level to maintain the pump actuated and to a reduction of the hydrostatic pressure or liquid level below a predetermined minimum, consequent upon the operation of the pump, to open the circuit and deactuate the pump, it is within the scope of this invention to provide holding and turn-off means 20 responsive to other predetermined conditions to maintain actuation of the pump and turn it off.

Means 20 includes a switch 41, disposed within a suitable chamber 43, and a pressure sensitive diaphragm 44 closing a portion of chamber 43. Switch 41 has predetermined operating and release forces. It is normally open and is provided with an operating button 46 disposed in operable relation with diaphragm 44. Switch 41 is connected with the other parts and portions of the control by suitable electrical leads in the manner and for the purpose to be hereinafter more fully described. A reinforcing disc 47 is preferably secured to diaphragm 44 intermediate the diaphragm and operating button 46.

In order to displace diaphragm 44 to actuate switch 41 and maintain the same closed until the liquid is evacuated to a desired predetermined minimum level, means 20 includes means whereby the static pressure above such level is communicated to and acts upon diaphragm 44.

To this end a recessed cover 49 is mounted over diaphragm 44 to define a chamber 50 on the side of the diaphragm remote from the switch. A suitable passageway 51, including fittings 52 and tube 53, leads from chamber 50 to a skirt member 54, which is adapted to sense the static pressure, and is provided with an open end or mouth 55 preferably disposed substantially at the level to which the liquid to be pumped is to be reduced. Skirt member 54 is conveniently formed integral with the housing of pump 2, adjacent discharge 56 and passageway 51 communicates the pressures within the skirt to the chamber 50.

Switch 41 has an operating force such that this force exerted thereon by diaphragm 44 in response to the static pressure of the collecting liquid communicated through skirt 54, passageway 51 and chamber 50 closes the switch before switch 31 is closed and a release force such that the hydrostatic pressure of the liquid acting upon diaphragm 44 exerts sufficient force to maintain the switch 41 closed and the pump actuated until the level of the liquid is reduced, by the action of the pump, to a level which exerts a static pressure insufficient to overcome the release force of switch 41, which thereupon opens. The level, conveniently is at, or just above the level of skirt mouth 55.

Alternatively, passage 51 could be connected with the pump volute, adjacent the pump discharge 56, so that pump discharge pressure is communicated to and acts upon diaphragm 44. Switch 41 then has an operating force such that the force exerted thereon by diaphragm 44 when the pump is discharging liquid is sufficient to depress button 46 and maintain the circuit closed, but the force exerted by the diaphragm when the pump draws and discharges air, is insufficient to maintain the button depressed and the circuit closed and therefore the switch opens, opening the circuit and deactuating the pump.

As noted above the control embodying this invention also includes means 22, responsive to a condition resulting from the actuation of the pump to transfer control of the pump from the turn-on 18 to the holding and turn-off means. Preferably means 22 comprises a stationary or centrifugal switch, which functions the speed of the motor, once it is at operating speed, to close the circuit through the pump holding and turn-off switch 41 to form a second circuit to the motor and parallel with the circuit through switch 31. Such a switch, of conventional type is indicated generally at 60 in FIGURE 5 and is conveniently adapted to open the auxiliary or start winding circuit substantially simultaneously with the closing of swtich 41.

This interrelation of switches 31, 41 and 60 and their operation for controlling the pump motor is indicated schematically by the wiring diagram of FIGURE 5 wherein the turn-on means 18, holding and turn-off means 20 and pump 2 are represented by appropriate rectangles containing switches 31, 41 and 60, respectively and the circuits are shown as they would be with the collection box dry and the pump at rest. Thus switches 31 and 41 are open and switch 60 is closed across the start windings. Variable turn-on 18 is disposed at any desired level within the collection box and when the liquid level reaches the predetermined height it closes switch 31 in the manner described above thereby completing the circuit through the main windings 61 via leads A and leads B and C as well as completing the circuit through the start windings 63 via lead A switch 31, lead D and switch 60 and leads E and C and actuating the pump.

Meanwhile the static pressure exerted on diaphragm 44, via skirt 54 and passageway 51, has displaced diaphragm 44 against operating button 46 to close switch 41 (dotted line position in FIGURE 5). The rotor then comes up to operating speed and stationary switch 60 operates to open between the contacts X and Y cutting out the start windings, and to close between contacts X and Z. Closing switch 60 across contacts X and Z provides a parallel circuit through the main windings via lead F, switch 41, lead G, switch 60, and leads D and C and the motor and pump continue to operate. When the continued operation of the pump reduces the liquid level below that sufficient to maintain switch 31 closed the switch opens, however the pump motor continues to operate as the main windings are connected through the parallel circuit through switches 41 and 60. When the liquid level is reduced below that sufficient to maintain switch 41 closed, the switch 41 opens breaking the parallel circuit through the main windings and deactuating the pump and motors.

As the rotor runs down, switch 60 resumes its normal position across contacts XY and the cycle is repeated.

Thus a control embodying this invention actuates a pump over a wide, almost infinite range of (limited as herein set forth) predetermined liquid levels independently of the relative position of the pump and the control and also, maintains the pump actuated and deactuates the pump independently of the turn-on switch, its location or the actuating liquid level by shunting the turn-on switch in response to a condition arising upon actuation of the pump and motor.

A modified form of control embodying this invention is disclosed in FIGURE 6 wherein like reference characters indicate like parts with the preferred embodiment of the invention shown in FIGURE 5.

In this form, however, the centrifugal or stationary switch 60' functions only as an ordinary start winding cut-out and the holding and turn-off switch 41 is cut into the main winding circuit, parallel with the turn-on switch 31, by means of a conventional solenoid switch or current relay indicated schematically at 65. Switch 65 is normally open and is actuated by the current flowing through the lead C after the closing of switch 31 and the actuation of the pump motor in response to the predetermined liquid level, as described above. Upon actuation switch 65 displaces, leftwardly as viewed, to close or cut in the main winding circuit through the leads A and F, the switches 41 and 65, and leads D' and C so as to hold the motor on and the pump actuated, after switch 31 opens and until the condition obtains for opening switch 41. The opening of switch 41 breaks the alternate main winding circuit causing the motor and pump to stop and switch 65 to open and the cycle can then be repeated.

Another modified form of control embodying this invention is shown in FIGURE 7 wherein like reference characters again refer to like parts as in FIGURE 5. Here turn-on means 18 with switch 31 is again adapted to be disposed at any desired position relative to the pump 2, in order to actuate the pump at any desired predetermined liquid level. In this form of the control, the holding and turn-off switch 41 is cut into the main winding circuit, in parallel with the turn-on switch 31, and the auxiliary windings are cut out of the circuit by a double pole solenoid switch or current relay 67. Switch 67 is shown in its normal at rest position in FIGURE 7.

In this form of the invention, when the liquid level rises sufficiently to close switch 31, the circuit is completed through both the start and main windings of the motor and through the coils of the solenoid switch via the lead A, switch 31, and leads B, D and C. As the motor comes up to speed and the current reaches the proper level, switch 67 is actuated to move leftwardly, as viewed, thereby opening the contacts X'Y' to cut out the start windings and closing the contacts Z' to close or cut in the parallel circuit through the main windings 61 and switch 41.

Switch 41 closes in response to a lower liquid level and maintains a closed circuit through the main windings after switch 31 opens, in the manner described above, and until the condition obtains for opening switch 41. When switch 41 opens the motor and pump stop, switch 67 resumes the position shown in FIGURE 7 and the apparatus is ready for the cycle to be repeated.

A still further modified form of invention is shown in FIGURES 8 and 9 wherein like references again refer to like parts as in FIGURE 5. In this instance, however, the holding and turn-off means 20 comprises a switch 70 actuated by a pressure responsive diaphragm which is closed by a low or minimal liquid level, in the collection box 4, and opens when the level of the liquid is reduced or is below this predetermined minimum level and the means by which control of the motor circuit through the main windings 61 is transferred form turn-on switch 31 to the holding and turn-off switch 70 is a switch 71 actuated by vane 72 (see FIGURE 9) in response to flow of fluid (air or oil), within the motor chamber upon the actuation and rotation of the motor rotor.

Switch 71 is adapted, upon actuation, to close the circuit through leads F and D' and switch 70 to provide a parallel circuit through the start windings 63, as in the other forms of this invention. In this form of the invention, the start windings are cut out by an ordinary centrifugal switch 60'. The control is shown in FIGURE 8 with the switches in their position when the motor is at rest and the collection box is dry or at least the level of liquid therein is below that minimum necessary to close switch 70.

As liquid collects in the box 4 it rises above that height necessary to actuate switch 70 and the switch is closed. However, the motor is not actuated as both switches 31 and 71 remain open. The liquid continues to rise until it reaches a level sufficient to close switch 31. This level is determined at any desired level by the positioning of the housing 19 in the manner described above. With switch 31 closed the circuit is completed through the main and start windings via leads A, B, D and E, and C and the motor begins operation. When the motor comes up to speed centrifugal switch 60' opens cutting out the start windings and the continued operation of the motor rotor causes the vane 72 to actuate switch 71 to close the same, thereby closing the parallel circuit through lead F switches 70 and 71 and lead D' to the main windings 61. The pump evacuates liquid from the collection box 4 until the level of the liquid is reduced below that necessary to maintain switch 31 closed and the switch thereupon opens. However, the pump and motor continue to operate because the circuit through the motor (main windings) remains closed through switches 70 and 71 until the level of the liquid is reduced below that necessary to maintain switch 70 closed. The switch 70 thereupon opens, opening the parallel circuit through the main windings and deactuating the motor. Upon the deactuation of the motor and rotor, fluid flow stops within the motor chamber and vane 72 comes to an at rest position, thereby opening switch 71 and the cycle can then be repeated as necessary.

Thus applicant has provided a pressure responsive control, for a submersible pump or similar apparatus, which is adapted to be disposed so as to actuate the pump at substantially any desired liquid level above a predetermined minimum and limited only by the length of the electrical leads provided. The level of actuation is chosen by positioning the housing 19 and the variable turn-on means disposed therein, as dseired by the user. Applicant has also provided a control having means for transferring the control of the pump motor circuit from the variable turn-on means to second means which is adapted to maintain the pump in operation and to deactuate the pump upon the occurrence of a predetermined condition resulting from the operation of the pump.

Modifications, changes and improvements to the above described and illustrated preferred and modified forms and embodiments of this invention may occur to those skilled in the art, who come to understand the principles and precepts thereof, without departing from the spirit and substance of the invention. Accordingly it is desired that the scope of the patent obtained hereon be limited only consistent with the advance by which the invention has promoted the art and not to the forms and embodiments of the invention herein particularly described and set forth.

I claim:

1. A control for submersible pumps and other apparatus having a motor, said control comprising first means responsive to a first predetermined condition to close a circuit and actuate the motor, second means responsive to a second predetermined condition to maintain the motor in operation after actuation and responsive to a predetermined condition resulting from the operation of the apparatus to deactuate the motor, and third means responsive to another predetermined condition arising consequent upon the actuation of said apparatus to transfer control of said motor from said first means to said second means.

2. The control according to claim 1 in which said first means is responsive to a predetermined liquid level.

3. A control for controlling submersible pumps and other apparatus having a motor, said control comprising a housing, a pressure responsive diaphragm supported on said housing and defining, together with said housing, a chamber, a switch disposed in said chamber and having an operating button in operable relation with said diaphragm, said diaphragm responding to a predetermined hydrostatic pressure to displace said button, close said switch and actuate said motor, said diaphragm responding to a predetermined reduction in said hydrostatic pressure to release said button and open said switch, said control, also, comprising first means responsive to a second predetermined condition to maintain said motor and apparatus in operation after actuation and responsive to a condition resulting from the continued operation of said motor and apparatus to deactuate said motor and apparatus, said control also comprising second means responsive to a condition arising consequent upon the actuation of said motor and apparatus to transfer control of said motor from said switch to said first means, said housing being separate from said motor and apparatus and being connected therewith by suitable electrical leads.

4. A control for controlling submersible pumps and the like having a motor, said control comprising a housing, a first pressure responsive diaphragm supported on said housing and defining, together with said housing, a chamber, a first switch disposed in said chamber and having an operating button in operable relation with said diaphragm, said diaphragm responding to a predetermined level of the liquid to be pumped to displace said button, close said switch and actuate said motor, said diaphragm responding to a predetermined reduction in said liquid level to release said button to open said switch, said control also comprising holding and turn-off means responsive to another predetermined condition to maintain said motor in operation after actuation and responsive to a condition resulting from the continued operation of said motor to deactuate said motor, said holding and turn-off means comprising a second chamber defined in part by a second pressure sensitive diaphragm, a second switch disposed in said second chamber in operable relation with said second diaphragm, and means communicating the static pressure of the liquid to be pumped to the side of said second diaphragm remote from said second chamber, said second diaphragm responding to a liquid level no greater than said predetermined liquid level to close said second switch, to the reduction of the liquid level to a predetermined minimum to release said switch to deactuate said motor and to intermediate liquid levels to maintain said switch closed and motor actuated, said control also comprising transfer means responsive to a condition arising consequent upon the actuation of said motor to transfer control of said motor from said first switch to said second switch, said first switch housing being separate from said motor and being connected therewith by suitable leads.

5. A control for controlling submersible pumps and the like having a split-phase motor with a rotor, main and start windings and main and start winding circuits, said control comprising a housing, a first pressure responsive diaphragm supported on said housing and defining, together with said housing, a chamber, a first switch disposed in said chamber and in said circuits in electrical series with said main and start windings, respectively, said switch having an operating button in operable relation with said diaphragm, said diaphragm responding to a predetermined level of the liquid to be pumped to displace said button, close said switch and actuate said motor, said diaphragm responding to a predetermined reduction in said liquid level to release said button to open said switch, said control also comprising holding and turn-off means responsive to another predetermined condition to maintain said motor in operation after actuation and responsive to a condition resulting from the continued operation of said motor to deactuate said motor, said holding and turn-off means comprising a second chamber defined in part by a second pressure sensitive diaphragm, a second switch disposed in said second chamber in operable relation with said second diaphragm, and means communicating the static pressure of the liquid to be pumped to the side of said second diaphragm remote from said second chamber, said second diaphragm being adapted to respond to a liquid level no greater than said predetermined liquid level to close said second switch, to the reduction of the liquid level to a predetermined minimum to release said switch to deactuate said motor, and to intermediate liquid levels to maintain said switch closed and said motor actuated, said control also comprising transfer means responsive to a condition arising consequent upon the actuation of said motor to transfer control of said motor from said first switch to said second switch, a second main winding circuit including said main windings and said second switch, said transfer means comprises a centrifugal switch mounted on said rotor and adapted to open said start winding circuit and close said circuit through said main winding and said second switch in response to a predetermined motor speed.

6. The control according to claim 5 in which said motor, second switch and centrifugal switch are disposed within a separate, second housing.

7. A control for a submersible pump or other apparatus having a motor, said control comprising first and second parallel, normally open circuits both of which include said motor, said first circuit comprising first switch means adapted to respond to a predetermined liquid level to close said first circuit and actuate said motor and apparatus, said second circuit comprising second switch means responsive to a second predetermined condition to close and responsive to a predetermined condition resulting from the operation of said motor and apparatus to open and break said second circuit to deactuate said motor, said second circuit also comprising third switch means responsive to a condition arising consequent upon the actuation of said motor and apparatus to close and responsive to the deactuation of said motor and apparatus to open, said second circuit being completed through said motor when said second and third switch means are closed, said first switch means opening said first circuit in response to a predetermined reduction in said predetermined liquid level after said conditions to close said second and third switch means obtain and before said condition to open said second switch means obtains.

8. The control according to claim 7 in which said motor is a split-phase motor having a rotor and start and main winding circuits, said third switch means comprises a centrifugal switch carried on said rotor and said start winding and second circuits pass through said centrifugal switch, said centrifugal switch responding to a predetermined motor speed to open said start winding circuit and to connect said second circuit with said main winding circuit.

9. The control according to claim 7 in which said second switch means comprises a current relay having a coil in electrical series with said motor and responsive to a predetermined current through said motor to close said current relay and connect said second circuit into electrical series with said motor.

10. The control according to claim 9 in which said motor is a split-phase motor having start and main winding circuits and said current relay responds to said predetermined current to close said second circuit into said main winding circuit and also responds to said predetermined current to open said start winding circuit.

11. The control according to claim 7, in which said apparatus has a housing defining a motor chamber, said motor has a rotor and is disposed in said chamber, said chamber is filled with a predetermined fluid, and said third switch means comprises a switch having a vane extending into said fluid, said vane responding to a predetermined rate of flow of said fluid acting on said vane, when said rotor is rotating, to close said switch and the cessation of said predetermined flow to open said switch.

References Cited in the file of this patent

UNITED STATES PATENTS

| | | |
|---|---|---|
| 1,780,380 | Durdin | Nov. 4, 1930 |
| 2,110,313 | Warrick | Mar. 8, 1938 |
| 2,147,422 | Bendz | Feb. 14, 1939 |
| 2,177,083 | Sykes et al. | Oct. 24, 1939 |
| 2,249,994 | Warrick | July 22, 1941 |
| 2,687,693 | Hudson | Aug. 31, 1954 |
| 2,749,495 | Walley | June 5, 1956 |
| 2,910,003 | Kaatz | Oct. 27, 1959 |
| 2,922,002 | Gilman | Jan. 19, 1960 |
| 2,933,570 | Tutthill | Apr. 19, 1960 |
| 2,949,126 | Kuntz et al. | Aug. 16, 1960 |